(12) United States Patent
Benedetto

(10) Patent No.: US 12,427,425 B2
(45) Date of Patent: Sep. 30, 2025

(54) INSTANTIATION OF AN INTERACTIVE ENTERTAINMENT EXPERIENCE WITH PRECONDITIONS REQUIRED TO EARN A VIRTUAL ITEM

(71) Applicant: Sony Interactive Entertainment Inc., Tokyo (JP)

(72) Inventor: Warren Benedetto, Foothill Ranch, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 388 days.

(21) Appl. No.: 18/076,353

(22) Filed: Dec. 6, 2022

(65) Prior Publication Data
US 2024/0181352 A1 Jun. 6, 2024

(51) Int. Cl.
*A63F 13/69* (2014.01)
*A63F 13/48* (2014.01)

(52) U.S. Cl.
CPC .............. *A63F 13/69* (2014.09); *A63F 13/48* (2014.09)

(58) Field of Classification Search
None
See application file for complete search history.

(56) References Cited

U.S. PATENT DOCUMENTS

| 2010/0227682 A1* | 9/2010 | Reville ............... A63F 13/69 463/29 |
| 2013/0190096 A1 | 7/2013 | Ronen et al. |
| 2020/0086217 A1* | 3/2020 | Trombetta .......... G07F 17/3272 |

OTHER PUBLICATIONS

ISR WO PCT/US2023/081019, dated Apr. 3, 2024, Total 10 pages.

\* cited by examiner

*Primary Examiner* — Jason T Yen
(74) *Attorney, Agent, or Firm* — Kilpatrick Townsend & Stockton LLP

(57) ABSTRACT

A method including receiving a notification of interest regarding a virtual item, wherein the virtual item is displayed in a virtual environment viewable by a requesting user. The method including accessing information of the virtual item, wherein the virtual item acquired by a first user is encoded with metadata including conditions that were satisfied by the first user to acquire the virtual item. The method including determining at least one condition to be satisfied by the requesting user to acquire the virtual item. The method including receiving a request to acquire the virtual item. The method including enabling a jump into the game play of the video game based on a first condition at a first point in a game play of a video game of the requesting user that enables the first condition to be satisfied, wherein the game play is controlled by the requesting user.

17 Claims, 6 Drawing Sheets

INSTANTIATION OF AN INTERACTIVE ENTERTAINMENT EXPERIENCE WITH PRECONDITIONS REQUIRED TO EARN A VIRTUAL ITEM

TECHNICAL FIELD

The present disclosure is related to gaming, and more specifically to facilitating the display of information about what is needed by a requesting user to acquire a virtual item that is discovered in a virtual environment such as a metaverse, and enabling the user to jump into a game play of a video game at a point that allows the requesting user to satisfy a condition that is required to acquire the virtual item.

BACKGROUND OF THE DISCLOSURE

Video games and/or gaming applications and their related industries (e.g., video gaming) are extremely popular and represent a large percentage of the worldwide entertainment market. Video games are played anywhere and at any time using various types of platforms, including gaming consoles, desktop or laptop computers, mobile phones, etc.

Players may interact with each other through corresponding avatars in various virtual environments, such as a metaverse that may be situated in a persistent virtual world enjoyed by many users. For example, a metaverse may create an alternate virtual world with many parallels to the many lives of people on earth. As another example, a metaverse may be developed within a multi-player video game.

An avatar of a user participating in a virtual environment may be associated with one or more virtual items that the user has earned while playing one or more video games. For example, the virtual items may include things like weapons, armor, prizes, trophies, etc. These items may be viewable to other users in the virtual environment. In such a case, another user may wish to learn about and/or acquire a virtual item owned by the user. The process to earn and/or unlock the virtual item typically is complex and may involve accomplishing one or more tasks in corresponding virtual environments, such as when playing one or more video games. Many times the user who owns the virtual item when asked may not necessarily remember and/or know each of the intricate details about how that virtual item was unlocked, such as which video game or video games were played and under which scenarios, so even of the users are friends the process to earn the virtual item may not be readily available to the interested user. In that case, the interested user may be forced to access a help guide (e.g., an online resource) that tells how to unlock the virtual item. The interested user still has to figure out how close he or she is in acquiring the virtual item, whether he or she owns a video game that is needed, then launch that video game, and further navigate to the proper area of a map of the video game to allow the requesting user to start unlocking the virtual item. The requesting user may decide that the virtual item is not worth the time and energy required to learn about how to acquire the virtual item, and then to launch at least one video game and navigate to the proper point in the video game to obtain the time.

It is in this context that embodiments of the disclosure arise.

SUMMARY

Embodiments of the present disclosure relate to a system by which a virtual item can be associated with metadata that communicates the conditions under which the virtual item was originally acquired by a user. The metadata may be analyzed with respect to a requesting user to determine what is required (e.g., one or more conditions that need to be satisfied) by the requesting user to acquire the virtual item. In that manner, the information for acquiring a virtual item is customized to a particular requesting user. The system may also be configured to launch a video game or application at a point that provides to the requesting user an opportunity to satisfy one of the conditions required to acquire the virtual item.

In one embodiment, a method is disclosed. The method including receiving a notification of interest regarding a virtual item from a device of a requesting user, wherein the virtual item is displayed in a virtual environment viewable by the requesting user. The method including accessing information of the virtual item, wherein the virtual item acquired by a first user is encoded with metadata including one or more conditions that were satisfied by the first user in a process performed for acquiring the virtual item. The method including determining at least one condition to be satisfied by the requesting user in order to acquire the virtual item. The method including receiving a request to acquire the virtual item from the device of the requesting user. The method including enabling a jump into the game play of the video game based on a first condition at a first point in a game play of a video game of the requesting user that enables the first condition to be satisfied, wherein the game play is controlled by the requesting user.

In another embodiment, a non-transitory computer-readable medium storing a computer program for implementing a method is disclosed. The computer-readable medium including program instructions for receiving a notification of interest regarding a virtual item from a device of a requesting user, wherein the virtual item is displayed in a virtual environment viewable by the requesting user. The computer-readable medium including program instructions for accessing information of the virtual item, wherein the virtual item acquired by a first user is encoded with metadata including one or more conditions that were satisfied by the first user in a process performed for acquiring the virtual item. The computer-readable medium including program instructions for determining at least one condition to be satisfied by the requesting user in order to acquire the virtual item. The computer-readable medium including program instructions for receiving a request to acquire the virtual item from the device of the requesting user. The computer-readable medium including program instructions for enabling a jump into the game play of the video game based on a first condition at a first point in a game play of a video game of the requesting user that enables the first condition to be satisfied, wherein the game play is controlled by the requesting user.

In still another embodiment, a computer system is disclosed, wherein the computer system includes a processor and memory coupled to the processor and having stored therein instructions that, if executed by the computer system, cause the computer system to execute a method. The method including receiving a notification of interest regarding a virtual item from a device of a requesting user, wherein the virtual item is displayed in a virtual environment viewable by the requesting user. The method including accessing information of the virtual item, wherein the virtual item acquired by a first user is encoded with metadata including one or more conditions that were satisfied by the first user in a process performed for acquiring the virtual item. The method including determining at least one condition to be satisfied by the requesting user in order to acquire the virtual item. The method including receiving a request to acquire the virtual item from the device of the requesting user. The method including enabling a jump into the game play of the video game based on a first condition at a first point in a game play of a video game of the requesting user that enables the first condition to be satisfied, wherein the game play is controlled by the requesting user.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
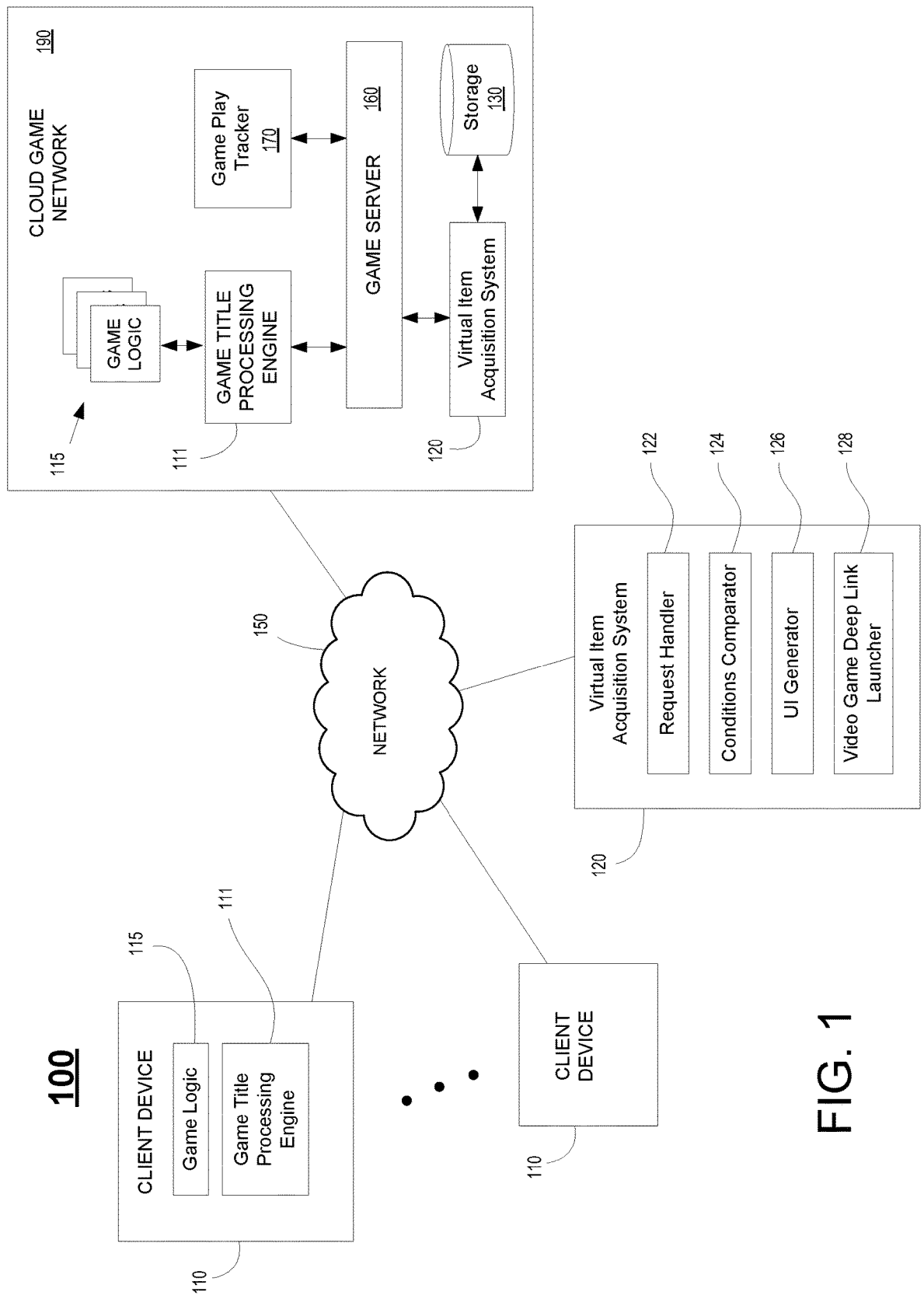
FIG. 1 illustrates a system including a virtual item acquisition system configured to facilitate the acquisition of a virtual item desired by a requesting user, in accordance with one embodiment of the disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods facilitating the acquisition of a virtual item for a requesting user made aware of the virtual item within a virtual environment (e.g., metaverse). For example, many interactive entertainment experiences such as video games and metaverses allow players to earn, win, discover, buy, trade, or otherwise acquire virtual items. These items may be things like weapons, armor, vehicles, dwellings, in-game cosmetics, emotes, prizes, trophies, etc. When a requesting player views a virtual item in a virtual environment (e.g., when viewing a player's trophy case), the requesting player may wish to learn how to earn the virtual item, and further may request to be immediately deep linked into a video game to start earning the virtual item. Embodiments of the present disclosure include systems and methods for associating a virtual item with metadata that communicates the conditions under which that item was originally acquired. This metadata may include human-readable text and visually pleasing images for display in a user interface. The metadata may include machine-readable data such as universal unique identifiers (UUIDs), JavaScript Object Notation (JSON) information (e.g., JSON blobs), etc. The metadata may be analyzed with respect to the requesting user to determine what is required (e.g., one or more conditions that need to be satisfied) by the requesting user to acquire the virtual item. In that manner, information for acquiring the virtual item is customized to a particular requesting user. For example, one or more conditions (also referred to as preconditions) associated with one or more video games may need to be satisfied by the requesting user in order to acquire the virtual item. A corresponding video game or application may be launched at a point that provides to the requesting user an opportunity to satisfy one of the conditions.

Advantages of the methods and systems configured to facilitating the acquisition of a virtual item for a requesting user made aware of the virtual item within a virtual environment include enabling the requesting user to immediately know how to earn a virtual item without necessarily having to search for that information, such as by asking the owner of the virtual item, or researching resources (e.g., online resources) detailing how to earn the item. Another advantage includes the filtering of the information so that the requesting user is made aware of conditions that are required to be satisfied by the requesting user and not necessarily the entire set of conditions required to earn a virtual item. That is, the requesting user may have already satisfied one or more of the required conditions in the set. Additionally, the information provided to the requesting user is not necessary for the user to acquire the virtual item. That is, the requesting user may not care about the intricate details about the conditions required to be satisfied to earn the virtual item, and instead wants to be placed into a game play of a video game that allows the user to begin earning the virtual item. In particular, another advantage provided by embodiments of the present disclosure include the automatic launching of a video game directly in the proper area and level (e.g., in a map of the virtual world or environment of the video game), so that the requesting user is able to try to satisfy at least one of the conditions required to earn the virtual item. In that manner, the user need not have to learn which video game is needed to satisfy a corresponding condition, and then manually launch the video game and navigate to the proper area and level (e.g., in a map of the virtual world) to try to satisfy a corresponding condition. Instead, embodiments of the present disclosure automatically launches the appropriate video game to allow the requesting user to satisfy a condition in order to earn a virtual item. As another advantage, if there are multiple conditions to be satisfied to earn the virtual item, once a first condition is satisfied by the requesting user, the user is jumped to the next area and level in the same video game to allow the requesting user to try to satisfy a second condition. If the second condition is associated with a different video game, then that video game is automatically launched directly in the proper area and level so that the requesting user is able to try to satisfy the second condition required to earn the virtual item.

Throughout the specification, the reference to "game" or video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1 illustrates a system 100 including a virtual item acquisition system 120 configured to facilitate the acquisition of a virtual item desired by a requesting user, in accordance with one embodiment of the disclosure. The system 100 may be implemented to facilitate a user to acquire a virtual item discovered through a virtual environment, such as a metaverse. For example, the virtual item acquisition system 120 is configured to facilitate the delivery of customized information to a requesting user indicating how close to and what is required (e.g., conditions that need to be satisfied) by the requesting user to acquire a virtual item. The virtual item acquisition system 120 may be further configured to launch a required application so that the requesting user may jump into a game play in order to satisfy a condition that is required to acquire the virtual item.

As shown, system 100 may provide gaming over a network 150 for and between one or more client devices 110. In particular, system 100 may be configured to provide gaming to users participating in one or more single-player gaming sessions or in one or more multi-player gaming sessions (e.g., participating in a metaverse generated by an application) via a cloud game network 190, wherein a corresponding video game can be executed locally (e.g., on a local client device of a corresponding user) or can be executed remote from a corresponding client device 110 (e.g., acting as a thin client) of a corresponding user that is playing the video game, in accordance with one embodiment of the present disclosure. In at least on capacity, the cloud game network 190 supports a multi-player session (e.g., metaverse, multi-player gaming session, etc.) for a group of users, to include delivering and receiving game data of players for purposes of coordinating and/or aligning objects and actions of players within a scene of a gaming world or metaverse, managing communications between users, etc. so that the users in distributed locations participating in a multi-player gaming session can interact with each other in the gaming world or metaverse in real-time.

In particular, system 100 may provide gaming control to one or more users playing or participating in one or more applications (e.g., video games, metaverse, etc.) either through local instances operating on client devices or through cloud based instances operating in the cloud game network 190 via network 150 in the multi-player session. Network 150 may include one or more communication technologies, including 5th Generation (5G) network technology having advanced wireless communication systems (e.g., cellular network technology). In some embodiments, the cloud game network 190 may include a plurality of virtual machines (VMs) running on a hypervisor of a host machine, with one or more virtual machines configured to execute a game processor module utilizing the hardware resources available to the hypervisor of the host. It should be noted, that access services, such as providing access to games of the current embodiments, delivered over a wide geographical area often use cloud computing. Cloud computing is a style of computing in which dynamically scalable and often virtualized resources are provided as a service over the internet.

In a multi-player session allowing participation for a group of users to interact within a gaming world or metaverse generated by an application (which may be a video game), some users may be executing an instance of the application locally on a client device to participate in the multi-player session. Other users who do not have the application installed on a selected device or when the selected device is not computationally powerful enough to executing the application may be participating in the multi-player session via a cloud based instance of the application executing at the cloud game network 190.

As shown, the cloud game network 190 includes a game server 160 that provides access to a plurality of video games. Most applications played in a corresponding multi-player session are played over the network 150 with connection to the game server 160. For example, in a multi-player session involving multiple instances of an application (e.g., generating virtual environment, gaming world, metaverse, etc.), a dedicated server application (session manager) collects data from users and distributes it to other users so that all instances are updated as to objects, characters, etc. to allow for real-time interaction within the virtual environment of the multi-player session, wherein the users may be executing local instances or cloud based instances of the corresponding application. Game server 160 may be any type of server computing device available in the cloud, and may be configured as one or more virtual machines executing on one or more hosts. For example, game server 160 may manage a virtual machine supporting a game processor that instantiates a cloud based instance of an application for a user. As such, a plurality of game processors of game server 160 associated with a plurality of virtual machines is configured to execute multiple instances of one or more applications associated with gameplays of a plurality of users. In that manner, back-end server support provides streaming of media (e.g., video, audio, etc.) of gameplays of a plurality of applications (e.g., video games, gaming applications, etc.) to a plurality of corresponding users. That is, game server 160 is configured to stream data (e.g., rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g., compressed) and streamed to the corresponding client device for display.

In the multi-player session, instances of an application may be executing locally on a client device 110 or at the cloud game network 190. In either case, the application as game logic 115 is executed by a game engine 111 (e.g., game title processing engine). For purposes of clarity and brevity, the implementation of game logic 115 and game engine 111 is described within the context of the cloud game network 190. In particular, the application may be executed by a distributed game title processing engine (referenced herein as "game engine"). In particular, game server 160 and/or the game title processing engine 111 includes basic processor based functions for executing the application and services associated with the application. For example, processor based functions include 2D or 3D rendering, physics, physics simulation, scripting, audio, animation, graphics processing, lighting, shading, rasterization, ray tracing, shadowing, culling, transformation, artificial intelligence, etc. In that manner, the game engines implement game logic, perform game calculations, physics, geometry transformations, rendering, lighting, shading, audio, as well as additional in-game or game-related services. In addition, services for the application include memory management, multi-thread management, quality of service (QOS), bandwidth testing, social networking, management of social friends, communication with social networks of friends, social utilities, communication channels, audio communication, texting, messaging, instant messaging, chat support, game play replay functions, help functions, etc.

Users access the remote services with client devices 110, which include at least a CPU, a display and input/output (I/O). For example, users may access cloud game network 190 via communications network 150 using corresponding client devices 110 configured for updating a session controller (e.g., delivering and/or receiving user game state data), receiving streaming media, etc. The client device 110 can be a personal computer (PC), a mobile phone, a netbook, a personal digital assistant (PAD), handheld device, etc.

In one embodiment, client device 110 may be configured with a game title processing engine and game logic for at least some local processing of an application, and may be further utilized for receiving streaming content as generated by the application executing at a back-end server, or for other content provided by back-end server support. In still other embodiments, for independent local processing the game title processing engine 111 includes basic processor based functions for executing an application and services associated with the application, as previously described. For local processing, game logic 115 is stored on the local client device 110 and is used for executing the application. For example, an instance of an application is executing by the game title processing engine 111 of a corresponding client device 110. Game logic 115 (e.g., executable code) implementing the application is stored on the corresponding client device 110, and is used to execute the application. For purposes of illustration, game logic 115 may be delivered to the corresponding client device 110 through a portable medium (e.g., optical media) or through a network (e.g., downloaded through the internet from a gaming provider).

In one embodiment, client device 110 may be configured as a thin client providing interfacing with a back end server (e.g., game server 160 of cloud game network 190) configured for providing computational functionality (e.g., including game title processing engine 111). In particular, client device 110 of a corresponding user (not shown) is configured for requesting access to applications over a communications network 150, such as the internet, and for rendering for display images generated by a video game executed by the game server 160, wherein encoded images are delivered (i.e., streamed) to the client device 110 for display in association with the corresponding user. For example, the user may be interacting through client device 110 with an instance of an application executing on a game processor of game server 160 in association with gameplay of a corresponding user, such as through input commands that are used to drive the gameplay. Client device 110 may receive input from various types of input devices, such as game controllers, tablet computers, keyboards, gestures captured by video cameras, mice, touch pads, audio input, etc. More particularly, an instance of the application is executed by the game title processing engine 111 and is configured for generating rendered images, which is delivered over network 150 for display at a corresponding display in association with client device 110. That is, client device 110 is configured for receiving encoded images (e.g., encoded from game rendered images generated through execution of a video game), and for displaying the images that are rendered for display. Game title processing engine 111 is able to support a plurality of applications using a plurality of game logics, each of which is selectable by the user.

The cloud game network includes a game play tracker 170 that is configured for tracking game plays of a plurality of users playing a plurality of video games. For example, telemetry data may be collected from the game plays, and may include game state data, user saved data, and metadata. The telemetry data may be stored in storage 130. Snapshots of the telemetry data may be captured at corresponding points in a corresponding game play of a corresponding application. A snapshot that was captured during a game play of an application allows for the instantiation of an instance of an application in support of a new game play. In particular, the new game play recreates the virtual environment of the application and begins at a point in the game play where the snapshot was captured. Specifically, game state data defines the state of the game play of an executing video game for a player at a particular point in time. Game state data allows for the generation of the gaming environment at the corresponding point in the game play. For example, game state data may include states of devices used for rending the game play (e.g., states of the CPU, GPU, memory, register values, etc.), identification of the executable code to execute the video game at that point, game characters, game objects, object and/or game attributes, graphic overlays, and other information. User saved data includes information that personalizes the video game for the corresponding player. For example, user saved data may include character information and/or attributes that are personalized to a player (e.g., location, shape, look, clothing, weaponry, assets, etc.) in order to generate a character and character state that is unique to the player for the point in the game play, game attributes for the player (e.g., game difficulty selected, game level, character attributes, character location, number of lives, trophies, achievements, rewards, etc.), user profile data, and other information. Metadata is configured to provide relational information and/or context for other information, such as the game state data and the user saved data. For example, metadata may include information describing the gaming context of a particular point in the game play of a player, such as where in the game the player is, type of game, mood of the game, rating of game (e.g., maturity level), the number of other players there are in the gaming environment, game dimension displayed, the time of the collection of information, the types of information collected, region or location of the internet connection, which players are playing a particular gaming session, descriptive information, game title, game title version, franchise, format of game title distribution, network connectivity, downloadable content accessed, links, language, system requirements, hardware, credits, achievements, awards, trophies, and other information.

In some embodiments, the game play tracker 170 performs tracking of virtual items. For example, metadata that is captured may be associated with a virtual item, and may include the conditions under which that virtual item was acquired by a corresponding user. In particular, for a corresponding virtual item acquired by the corresponding user, the game play tracker may be configured to capture metadata that describes the conditions, within one or more game plays of one or more video games, that were satisfied by the user to achieve and/or acquire the virtual item. The metadata captured for the virtual items may be stored in storage 130.

In addition, system 100 includes a virtual item acquisition system 120 with functionality configured to receive requests for acquisition information regarding virtual items encountered by a requesting user in a virtual environment (e.g., metaverse, multi-player video game, etc.) and for enabling the requesting user to jump into a game play of a video game in order to begin acquiring the virtual item. The virtual item acquisition system 120 may be located at the cloud game network 190 or may be remote from the cloud game network 190.

In particular, the virtual item acquisition system 120 includes a request handler 122, conditions comparator 124, user interface (UI) generator 126, and deep link launcher 128. The request handler 122 is configured to receive requests from the requesting user, such as an initial request for information about a virtual item, wherein desired information may include general information about the virtual item, and what is required by the requesting user to acquire the virtual item, such as conditions that need to be satisfied in one or more video games. The conditions comparator 124 is configured to determine the entire set of conditions required to acquire a virtual item, determine which conditions have already been satisfied by the requesting user, and determine one or more conditions that need to be satisfied by the requesting user to acquire the virtual item. The UI generator 126 is configured to generate a UI and include information related to the virtual item, including information about the virtual item, and the one or more conditions that need to be satisfied by the requesting user to acquire the virtual item. In addition, the UI generator 126 may include one or more selectable icons, one of which when selected initiates a request to start earning the virtual item.

The deep link launcher 128 is configured to launch an instance of a video game in support of a game play that begins at a point that provides to the requesting user an opportunity to satisfy one of the conditions required to acquire the virtual item. That is, a deep link into a video game at the point in the game play is performed to allow the requesting user to begin acquiring the virtual item. The deep link launcher 128 may cooperate with the cloud game network 190 and/or a client device 110 to enable the deep link to the point in the video With the detailed description of the system 100 of FIG. 1, flow diagram 200 of FIG. 2 discloses a method for facilitating the acquisition of a virtual item desired by a requesting user by porting the user to a point a video game that allows the requesting user to satisfy a condition required for acquiring the virtual item, in accordance with one embodiment of the present disclosure. The operations performed in flow diagram 200 may be implemented by one or more of the previously described components, and also system 100 described in FIG. 1, including virtual item acquisition system 120 and the cloud game network 190.

At 210, the method includes receiving a notification of interest regarding a virtual item from a device of a requesting user, wherein the virtual item is displayed in a virtual environment viewable by the requesting user. For example, the requesting user may be participating in a virtual environment with other users, such as in a lobby of a multi-player video game, or at the house of another player within a virtual environment. For purposes of illustration, the virtual environment may be a metaverse within which the requesting user and other users interact with each other and objects within the metaverse. That is, the metaverse may be a persistent world within which users may come and go as they like, and interact with other users that are also currently within the metaverse. The users within the metaverse may carry with their respective characters or avatars virtual items that were acquired through participation in interactive entertainment experiences, such as when playing video games. For example, the users may be able to earn, win, discover, buy trade, or otherwise acquire virtual items. Also, the users may be associated with trophy cases that are visible to other users in the metaverse, wherein the trophy case contains one or more virtual items that have been acquired by each corresponding user.

For purposes of illustration only, an example is provided with two users, Andy and Bob, to describe the process outlined in flow diagram 200 that may be implemented so that a requesting user can learn about and start to earn a virtual item. In the example, assume that a player (Andy) has earned a virtual item (i.e., a "Magic Sword") by defeating all five bosses in a fictional Game Z. Andy may display that Magic Sword in his virtual trophy case, as a way to brag to his friends that he has accomplished this very difficult feat. The trophy case may be visible or accessible to other users when Andy is participating in a metaverse, and may include multiple virtual items that were earned by Andy across multiple video games or interactive entertainment experiences. When another player (Bob) views a virtual item, for example in the virtual trophy case, that player may wonder, "how was that virtual item acquired, and how might I acquire it too?" That is, Bob is able to view the trophy case including virtual items earned by Andy, and as such, Bob wonders how he too can earn the Magic Sword. In one implementation, Bob is not necessarily playing a video game or the video game allowing acquisition of the Magic Sword, but wants to jump into the video game to earn the Magic Sword.

Bob is able to begin a process of learning about the virtual item, and if desired jump into a game play of a video game that enables Bob to start to earn the virtual item by sending the notification of interest about the virtual item. In one embodiment the notification of interest is initiated by selecting the virtual item within the metaverse. For example, Bob may click on the virtual item as displayed in the metaverse in one embodiment, or may perform other actions that expresses a desire to begin the process of learning about the virtual item and jumping into a game play to start earning the virtual item. As a result, the notification of interest is delivered to the virtual item acquisition system over a network.

At 220, the method includes accessing information of the virtual item, wherein the virtual item acquired by a first user is encoded with metadata including one or more conditions that were satisfied by the first user in a process performed for acquiring the virtual item. Video games and metaverses allow users to win, discover, buy, trade, or otherwise acquire virtual items (e.g., weapons, armor, vehicles, dwellings, in-game cosmetics, emotes, prizes, trophies, etc.). As previously described, game plays of users playing any of a multitude of video games can be tracked and analyzed to determine how a corresponding user has earned a virtual item. For example, one or more conditions that were satisfied by the corresponding user through one or more video games to earn the virtual item may be tracked and/or determined through analysis.

Further, the virtual item is associated with metadata disclosing one or more conditions that was captured and/or generated and stored for later access. In particular, the virtual item is "marked" or "encoded" or "embedded" with the metadata, such that the virtual item and the metadata are paired together wherever the virtual item goes in whatever virtual environment. That is, the metadata communicates the conditions in one or more game plays of one or more video game under which the virtual item was originally acquired by a corresponding user. Continuing with the example provided with Andy and Bob, the metadata may indicate that Andy earned the Magic Sword by defeating five bosses in the Game Z video game.

In another embodiment, the metadata can include information about whether the virtual item can still be acquired. For example, the virtual item may be unique (e.g., a non-fungible token—NFT) of which only one can be earned by a corresponding user. In other cases, the virtual item may be earned within a limited time (e.g., a limited time offer).

There are many ways that a user may acquire a virtual item. They typically involve accomplishing tasks in a corresponding virtual environment, such as when playing a video game that generates the virtual environment. For example, a condition for earning the virtual item involves accomplishing the task. Sometimes two or more of these tasks must be accomplished and/or occur in order for the player to earn the virtual item. For purposes of illustration only, some examples of tasks to be performed when satisfying a condition for acquiring a virtual item may include: visiting a particular area of a map; being at a particular area of the map at a particular time; interacting with a particular non-player character (NPC); completing a level, objective, or quest; winning a specific tournament; completing a challenge; completing a challenge with some specific threshold like fastest time or highest score; defeating an enemy or "boss"; reaching some threshold, i.e., earning enough points or XP; maintaining a streak; participating in a time-limited event, etc.

At 230, the method including determining at least one condition to be satisfied by the requesting user in order to acquire the virtual item. As previously described, the conditions that were satisfied by the user who owns the virtual item can be tracked and/or determined. In addition, the game plays of the requesting user are also tracked. In that manner, an analysis can be performed to determine which of the conditions needed to earn the virtual item have already been satisfied by the requesting user, and to determine the conditions that still need to be satisfied by the requesting user to earn the virtual item can also be determined. That is, a comparison may be made between each of a set of conditions that were satisfied by the user who has already earned the virtual item, and conditions that have been satisfied by the requesting user to determine which conditions in the set still need to be satisfied by the requesting user.

A virtual item might require multiple steps to earn them. For illustration, in the example of Andy and Bob, the Magic Sword is earned by defeating five bosses. In one embodiment, the metadata associated with the virtual item would represent each of the preconditions or conditions separately.

A user interface (UI) may be generated that displays some of the metadata associated with the virtual item. The UI may be delivered to a device of the requesting user over a network (e.g., from the virtual item acquisition system to the device). For example, some or all of the conditions that are required to earn the virtual item may be included in the UI. In another example, the UI includes the conditions that still need to be required by the requesting user to acquire the virtual item. That is, the conditions required to be satisfied to earn the virtual item may be compared to a current progress in one or more game plays of one or more video games (e.g., to see if a condition has been satisfied in a corresponding video game). In that manner, the UI is customized to the user. In addition, general information about the virtual item may be include in the UI. Continuing with the example provided for illustration with Andy and Bob, the UI may display some of the metadata associated with Magic Sword, and tells Bob (the requesting user) that the Magic Sword is from Game Z, that the Magic Sword is still earnable (e.g., still within the time period of a limited-time offer, or the virtual item does not have a time limit on earning the item), and that Bob must defeat the last of five bosses (i.e., Bob has already defeated four of the five bosses).

At 240, the method including receiving a request to acquire the virtual item from the device of the requesting user. As previously described, the requesting user receives a user interface listing at least one or more conditions that need to be satisfied to acquire the virtual item. In addition the UI includes an icon or button or means for selection that when selected initiates a request to acquire the virtual item. Continuing with the example provided above with Andy and Bob, it can be determined that Bob has been playing Game Z, and through the UI learns that he has actually already defeated four of the five bosses. Bob may be excited to learn that he is close to earning the Magic Sword, therefore, Bob may decide he wants to try and earn the Magic Sword himself, right now. Using the metadata associated with the Magic Sword, the user interface provides Bob with a button that reads "Get It Now," as an example, of which if selected a deep link is enabled to the next step or condition Bob needs to satisfy or complete to earn the Magic Sword.

At 250, the method includes enabling a jump into the game play of the video game based on a first condition at a first point in a game play of a video game of the requesting user that enables the first condition to be satisfied, wherein the game play is controlled by the requesting user. The jump into the game play is triggered by receiving a request to acquire the virtual item that originates from the requesting user (e.g., the requesting user selects the interactive icon on the UI indicating a desire to engage with a video game to earn the virtual item). The request may be received by the video game deep link launcher of FIG. 1, for example. The deep link launcher communicates with the game server of the cloud game network and/or a local client device to launch a corresponding video game in order to enable the requesting user to try and satisfy at least one condition for earning the virtual item.

In one embodiment, a deep link is established automatically based on the request. That is, the requesting user need only to interact with an interactive icon in the user interface to establish and send the request to start earning the virtual item, which in turn triggers the deep link to a point in a video game that enables the requesting user to try to satisfy at least one condition required to earn the virtual item. Using the metadata associated with the virtual item, the cloud game system and/or the local client device can automatically launch the corresponding video game and deep link the requesting user into a part of the video game where one condition can be attempted to be satisfied for acquiring the virtual item. Continuing with the example provided above with Andy and Bob, when Bob clicks the interactive icon (e.g., button) in the UI, a game system (e.g., cloud gaming system or local client device) as directed by the virtual item acquisition system uses the metadata associated with the virtual item (Magic Sword) to automatically launch an instance of Game X controllable by the requesting user, and further deep links the game play of the instance of Game X directly into the final boss battle that Bob needs to complete in order to earn the Magic Sword.

There are many ways to "deep link" into a game with preconditions for earning a virtual item. For purposes of illustration, some examples include, but is not limited to: teleporting to a specific area of a map of a virtual environment of a video game; loading a specific level, quest, or objective; teleporting to a location of a specific NPC, such as a quest giver, vendor, shopkeeper, etc.; loading a specific challenge, with a required time-limit or required score set as a goal; tracking progress towards a requisite threshold or milestone, such as a score or XP counter or progress bar; initiating a game invitation flow to invite friends to join a match in order to earn an item in a multiplayer game, etc.

In some embodiments, not all virtual items can be earned by immediately deep linking into a video game. In some cases, another action may have to be initiated instead by the system and/or method. For example, the requesting user must participate in a tournament where the virtual item can be earned. In that case, the requesting user may be automatically entered into the tournament, and sending notification to the requesting user of the tournament with instructions on how and when to play. In other examples, a calendar invite or reminder is created that indicates that the requesting user is to participate in a time-specific or time-limited event. In still another example, a "ticket" for the requesting user is secured to a time-specific or time-limited event.

In one embodiment, a virtual item may only be purchased using in-game currency. In this case, the requesting user could be deep linked into a digital store where the virtual item can be purchased. For example, the requesting user may be deep linked to a digital store within a video game or metaverse or other interactive experience where the item can be purchased. In cases where the requesting user does not have enough in-game currency, the requesting user may be deep-linked to a digital store where more in-game currency can be purchased (e.g., using real-world currency to purchase in-game currency).

Figure 3:
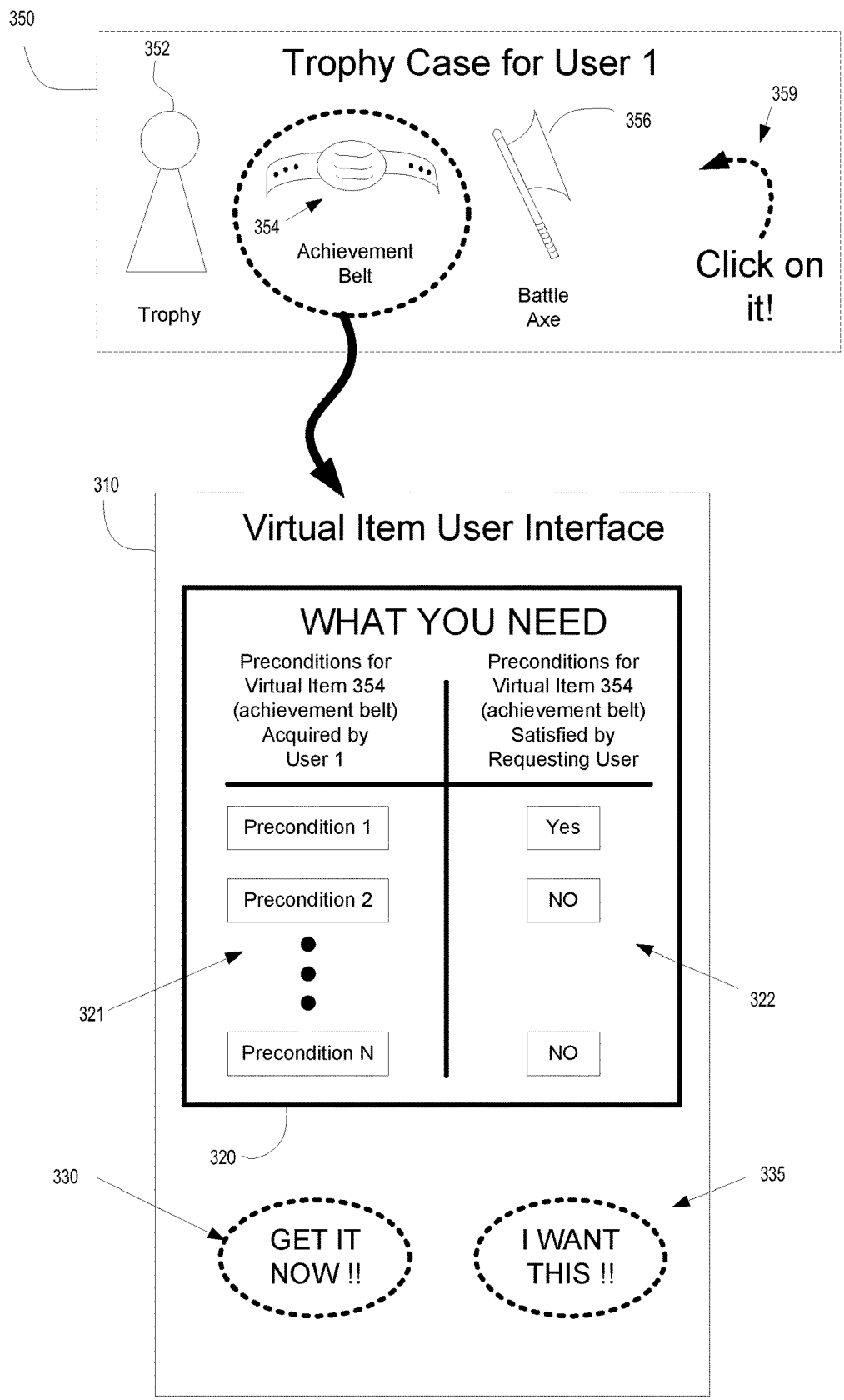
FIG. 3 illustrates a user interface for facilitating the acquisition of a virtual item desired by a requesting user, in accordance with one embodiment of the present disclosure.

FIG. 3 illustrates a user interface 310 for facilitating the acquisition of a virtual item desired by a requesting user, in accordance with one embodiment of the present disclosure. As shown, the requesting user may become aware of a virtual item through participation in an interactive entertainment experience (e.g., multi-player gaming, metaverse, etc.), of which both the requesting user and User 1 are participants. For example, the requesting user may be able to view and/or interact with a trophy case 350 associated with User 1. Through playing one or more video games or interactive applications, User 1 has earned multiple virtual items, such as a trophy 352, an achievement belt 354, and a battle axe 356.

A notification of interest may be triggered by the requesting user selecting any of the virtual items shown in the trophy case 354, or a virtual environment shown in the virtual environment within which the requesting user is participating. For example, the requesting user may be interested in one of the virtual items shown in trophy case 350, such as the achievement belt 354. An instruction 359 is provided with the displaying of the trophy case 354, wherein the instruction directs the user to click on a virtual item to obtain related information.

Once a virtual item is selected (i.e., by interacting with the virtual item, or selecting the virtual item, etc.), a virtual item user interface 310 is generated and includes at least one condition associated with earning the virtual item. The UI 310 is generated for purposes of interaction with the requesting user. For example, window 320 of UI 310 displays a set 321 of preconditions or conditions (e.g., preconditions 1-N in the set) that were satisfied by User 1 in order to earn the achievement belt 354. The set of preconditions may include only one precondition. That is, User 1 satisfied the preconditions 1-N in one or more video games to acquire the achievement belt 354. As previously described, metadata collected through the game plays of User 1 can indicate and/or can be analyzed to determine the preconditions 1-N. These preconditions can be associated with (e.g., embedded within or encoded with, etc.) the achievement belt 354.

In addition, window 320 also displays a set 322 of preconditions or conditions that already have been satisfied by the requesting user. The set 322 of preconditions may only include one precondition. As previously described, game plays of the requesting user and User 1 are tracked. In that manner, the preconditions 1-N are known and/or can be determined and associated with the achievement belt 354. Also, because the game plays of the requesting user are also tracked, metadata from those game plays can be analyzed to determine which, if any, of the preconditions 1-N have been satisfied by the requesting user. For purposes of illustration, the set 322 of preconditions indicates that only precondition 1 has been satisfied by the requesting user. In that manner, it can be determined that the requesting user still needs to satisfy preconditions 2-N in order to earn the achievement belt 354.

In addition, an interactive icon or actuator 330 is provided within UI 310 that enables the requesting user to jump into a game play to begin earning the selected virtual item (i.e., the achievement belt 354). In particular, by interacting with the icon 330 (e.g., a "GET IT NOW!!" button), a request to acquire the virtual item is initiated by the requesting user. For example, the request is further sent back to a virtual item acquisition system.

In one embodiment, launching a video game includes choosing a first condition in the set 322 of conditions that need to be satisfied by the requesting user. The first condition may be chosen based on a logical sequence of conditions that are satisfied in a particular order, or may be chosen based on some other factor (e.g., randomness) when the order of conditions to be satisfied is not important. The first condition is presented in a corresponding video game, or can be satisfied within the video game. It is then determined that the first condition is aligned with a first point in a game play of the same video game of the requesting user. For example, metadata (e.g., determined from captured snapshots) from the game plays of the requesting user and User 1 may be analyzed to determine the alignment. As previously described, the game play of the video game of the requesting user includes captured snapshots, wherein a first snapshot is captured at a first point in the game play of the video game of the requesting user. The first snapshot can be accessed and used to jump the requesting user in a game play of the video game in order to satisfy the first condition. Specifically, an instance of the video game is instantiated using the first snapshot for a game play of the video game that is controlled by the requesting user, wherein the instance of the video game begins at the first point in the video game where the first snapshot was captured. In that manner, the requesting user is able to try to satisfy the first condition in the game play of the video game that is launched.

In another embodiment, the UI 310 includes an interactive icon 335, such as a "I WANT THIS" button that allows the requesting user to track their progress towards earning the virtual item. By tracking progress, the requesting user may have an added incentive to keep playing the video game, since the requesting user has essentially created a bespoke or customized objective within the video game for themselves. For example, if there are multiple steps and/or conditions required to acquire a virtual item, these steps (e.g., satisfying a condition) can be tracked and "checked off" each time a condition is satisfied. In that manner, the requesting user is aware of how close they are to acquiring the virtual item.

In some situations, the requesting user is no longer able to acquire the virtual item. For example, the virtual item may not be earnable because that virtual item was only available for a limited time, or a specific event that has already occurred. In this case, the UI 310 would not include the interactive icon 330 (e.g., "GET IT NOW" button), or interactive icon 335 ("I WANT THIS" button). Instead, the UI 310 may include information informing the requesting user the virtual item is no longer available, and the reasons for the unavailability.

In another embodiment, a virtual item might be non-fungible, meaning there is one and only one instance of the item available (e.g., an NFT). In this case, the interactive icon 330 and/or interactive icon 335 (e.g., "GET IT NOW" button or "I Want This" button, respectively) when activated could inform the requesting user that the item is an NFT and can no longer be earned. In that case, a communication channel may be established between the requesting user and the user owning the one of a kind virtual item to facilitate negotiations between the parties for a transfer of the virtual item. In the example provided with Andy and Bob, Bob may be informed that the Magic Sword is no longer available, and a connection is established between Bob and Andy so that Bob might purchase or trade for the item. For example, this could be done through an auction system (e.g., third party auction system), where Bob can send Andy a bid for how much he'd pay for the virtual item, or Andy could set a price ahead of time and allow Bob to purchase the item for that price.

In some embodiments, the requesting user is unable to earn the virtual item because they have not reached a certain threshold. For example, the virtual item may be earned at Level 10 of a corresponding video game (e.g., a particular door gaining entry to an area to satisfy a condition is unlocked after reaching Level 10), but the requesting user is only at Level 6 of the video game. In that case, the interactive icon 330 and/or interactive icon 335 (e.g., "GET IT NOW" button or "I Want This" button, respectively) when activated could inform the requesting user to come back when they have reached Level 10. In another example, the virtual item can only be reached when the character of the requesting user has reached a gold status, but the requesting user has only reached a silver status. In that case, the interactive icon 330 and/or interactive icon 335 (e.g., "GET IT NOW" button or "I Want This" button, respectively) when activated could inform the requesting user to come back when they have reached a Gold status.

Figure 4:
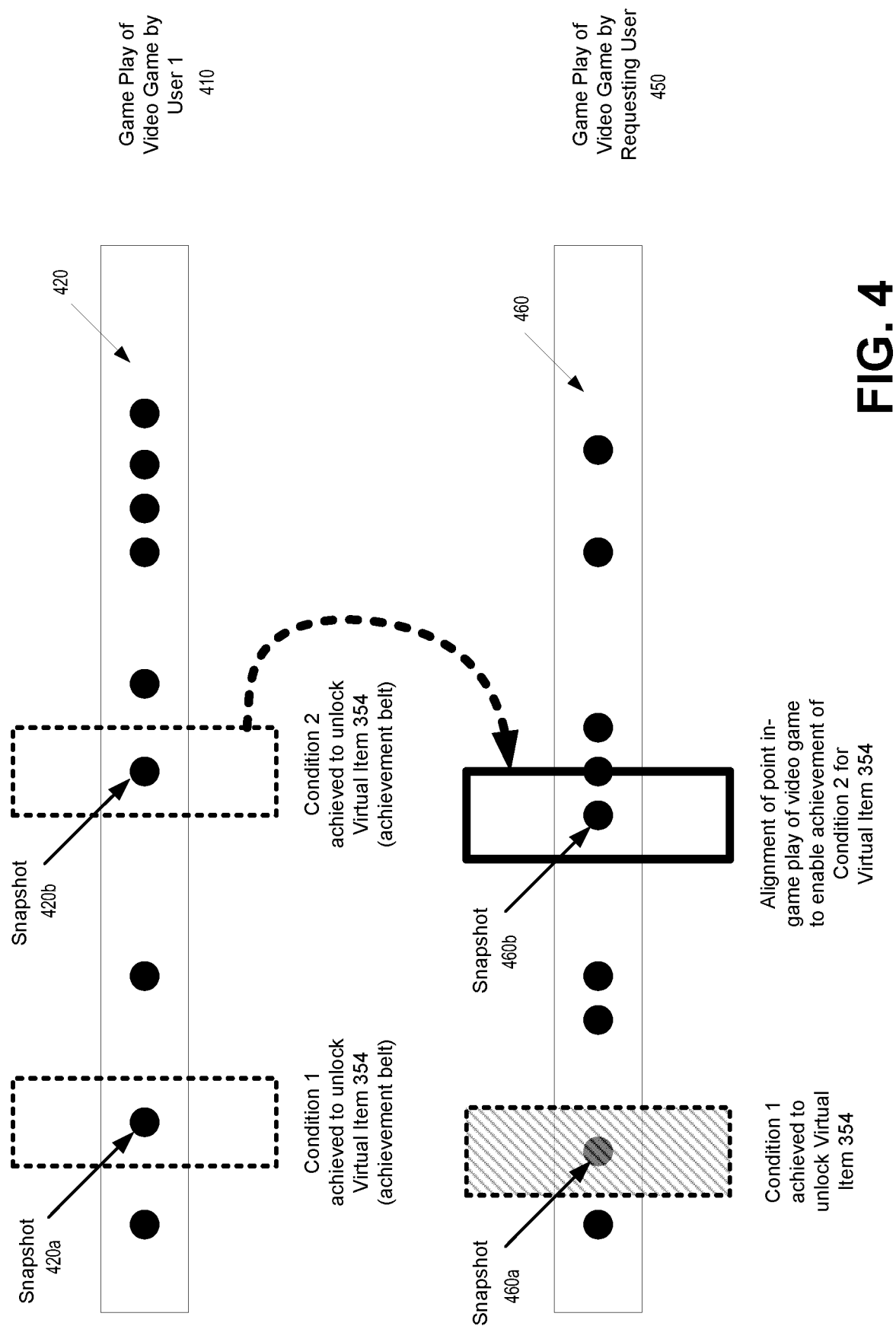
FIG. 4 is a diagram illustrating a game play of a user owning a virtual item showing a point in the game play where a condition was satisfied in a process to acquire the virtual item and a correlation of another point in a game play of a requesting user that presents the requesting user an opportunity to satisfy the same condition in order to acquire the virtual item, in accordance with one embodiment of the present disclosure.

FIG. 4 is a diagram illustrating a game play 410 of a video game of a user owning a virtual item and the alignment of the game play of the user with a game play 450 of a requesting user to facilitate the launching of the game play of the requesting user at a point that enables the requesting user to satisfy a condition for earning the virtual item, in accordance with one embodiment of the present disclosure.

In particular, the game play 410 includes a plurality of snapshots 420 that were captured. As previously described, the snapshot include game state, user data and metadata generated and/or captured during the game play 410, wherein each snapshot can be used to recreate the virtual environment of the video game at the point where the snapshot was captured. That is, each snapshot can be used to launch an instance of the video game and recreate the virtual environment at a point in the video where the snapshot was captured.

As shown, the game play 410 shows at least two conditions that were satisfied by User 1 to acquire the corresponding virtual item (i.e., the achievement belt 354), including condition 1 and condition 2. In particular, in the game play 410 of User 1, snapshot 420a is associated with a point in the game play 410 where condition 1 was satisfied in a process performed by User 1 to acquire the virtual item. Also, in the game play 410 of User 1, snapshot 420B is associated with a point in the game play 410 were condition 2 was satisfied in the process performed by User 1 to acquire the virtual item.

The game play 450 of the same video game of the requesting user is also shown. The game play 450 includes a plurality of snapshots 460 that were captured, and includes game state, user data and metadata generated and/or captured during the game play 450. By comparing and/or analyzing the information associated with the snapshots captured in game play 410 of User 1 and the game play 450 of the requesting user, a correlation of points between the two game plays can be made. Specifically, the areas of the game play 410 of User 1 that correspond with condition 1 and condition 2 can be correlated with specific points in the game play 450 of the requesting user. For example, the area in the game play 410 where condition 1 was satisfied by User 1 (and associated with snapshot 420a) may be correlated with a point in the game play 450 of the requesting user, wherein that point may be generally recreated by snapshot 460a to give the requesting user an opportunity to satisfy condition 1 in a process to acquire the virtual item (i.e., the achievement belt 354).

Through analysis of information related to the game plays 410 and 450 of the requesting user and User 1, it may be determined that condition 1 has already been achieved by the requesting user. As such, in order to acquire the virtual item, the requesting user needs to at least satisfy condition 2, as condition 1 has already been satisfied. In particular, the area in the game play 410 where condition 2 was satisfied by User 1 (and associated with snapshot 420b) may be correlated with a point in the game play 450 of the requesting user, wherein that point may be generally recreated by snapshot 460b to give the requesting user an opportunity to satisfy condition 2 in a process to acquire the virtual item (i.e., the achievement belt 354).

In that manner, snapshot 460b may be used to instantiate an instance of the video game at the point where snapshot 460b was captured, and recreates the virtual environment within which condition 2 may be satisfied by the requesting user.

In some cases, multiple conditions need to be satisfied by the requesting user. Those conditions may be associated with one or more video games. For example, in a process for acquiring a virtual item, a requesting user may have to satisfy two conditions in one video game. As previously described, one of the conditions (a first condition) may be satisfied by deep linking the user to a point in the video game that allows the requesting user to satisfy the first condition. The second condition may also be satisfied in the same video game. In the process, it may be determined that the first condition has been satisfied by the requesting user. Also, it can be determined that a second condition is needed to be satisfied by the requesting user in order to acquire the virtual item. It may be determined that the second condition is aligned with a second point in the game play of the video game of the requesting user, as previously described. In that manner, a second snapshot in the game play of the requesting user may be accessed, wherein the second snapshot was captured at the second point in the game play of the requesting user. The second snapshot may be used to jump the existing game play to the second point to enable the second condition to be satisfied by the requesting user.

In another embodiment, multiple conditions need to be satisfied by the requesting user. Those conditions may be associated with one or more video games. For example, in a process for acquiring a virtual item, a requesting user may have to satisfy two conditions in two video games. As previously described, one of the conditions (a first condition) may be satisfied by deep linking the user to a point in a first video game that allows the requesting user to satisfy the first condition. In the process, it may be determined that the first condition has been satisfied by the requesting user. As the requesting user completes the first condition, a deep-link may be established within a corresponding video game to where the requesting player needs to go to complete the next step or condition. Also, it can be determined that a second condition is needed to be satisfied by the requesting user in order to acquire the virtual item. It may be determined that the second condition is aligned with a second point in a game play of a second video game of the requesting user, as previously described. In that manner, a second snapshot in the game play of the requesting user of the second video game may be accessed, wherein the second snapshot was captured at the second point in the game play of the second video game of the requesting user. Specifically, the second snapshot may be used to instantiate an instance of the second video game for the game play of the second video game that is controlled by the requesting user, wherein the instance of the second video game begins at the second point in the video game where the second snapshot was captured. In that manner, the requesting user is able to try to satisfy the second condition in the game play of the second video game that is launched.

In one embodiment, the virtual item corresponds to physical item. For example, the virtual item may be a representation of the physical item, such as a virtual shirt corresponds to a physical shirt. Because the digital version of the shirt is not earnable within a gaming space, when the requesting user makes a request for the virtual item, instead of deep-linking the requesting user to a point in a video game to earn the digital representation of the shirt, the requesting user is linked to a site (e.g., website or virtual store) of an entity that sells the physics item (i.e., shirt). In one implementation, once the requesting user has purchased the physical version of the virtual item, then the virtual item becomes unlocked for use by the requesting user (e.g., wear on an avatar of the requesting user or character within a virtual environment).

Figure 2:
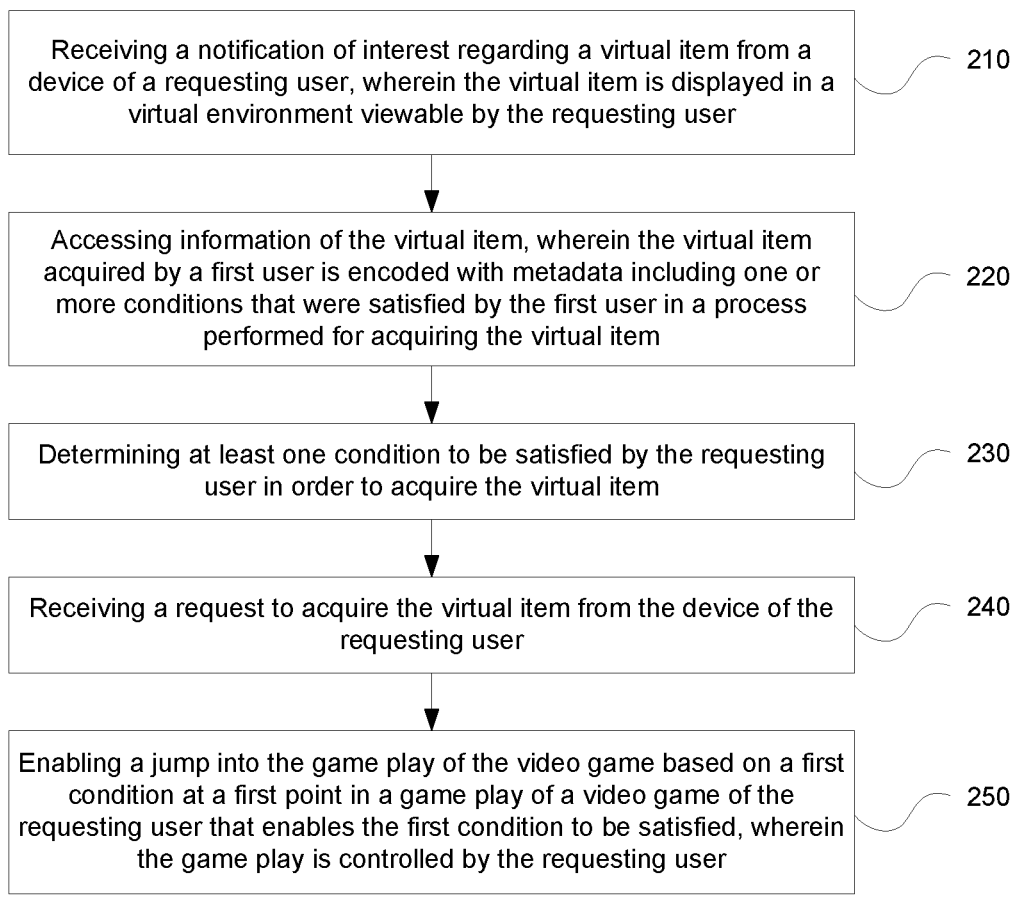
FIG. 2 is a flow diagram illustrating a method for facilitating the acquisition of a virtual item desired by a requesting user by porting the user to a point a video game that allows the requesting user to satisfy a condition required for acquiring the virtual item, in accordance with one embodiment of the present disclosure.
Figure 5:
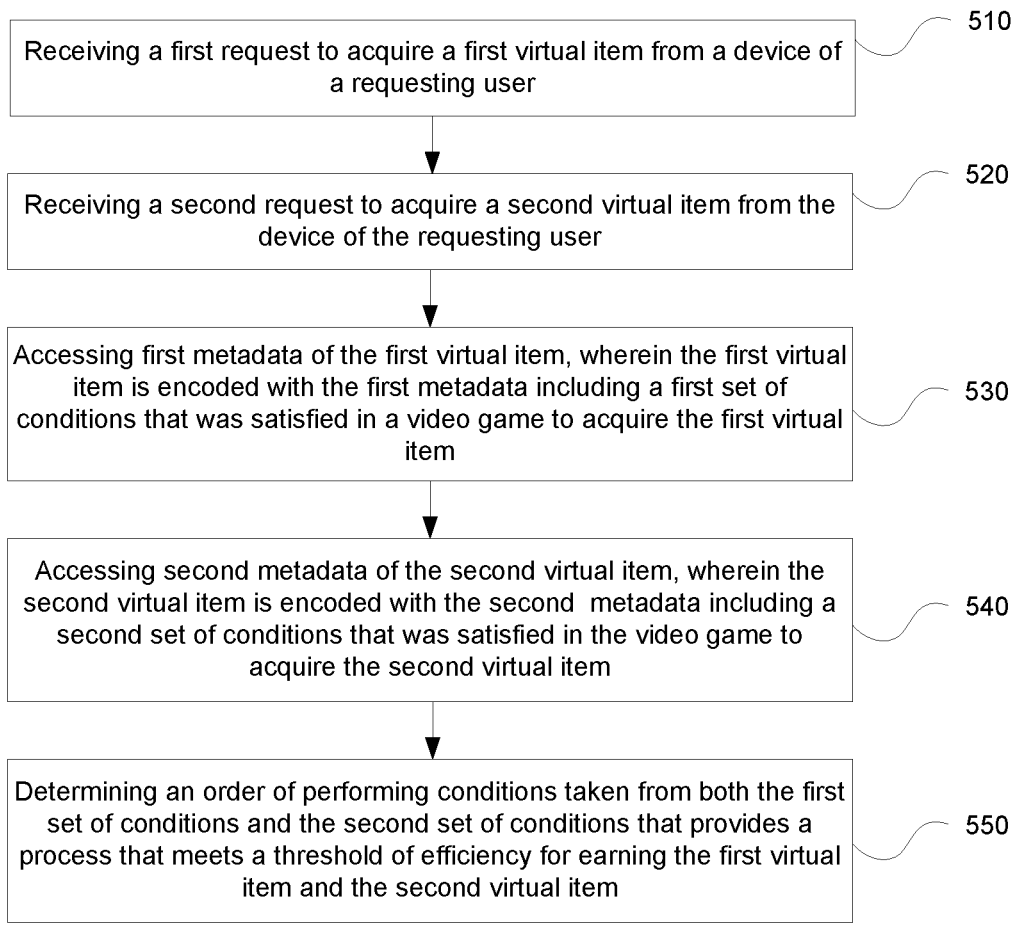
FIG. 5 is a flow diagram illustrating a method for facilitating the acquisition of multiple virtual items desired by a requesting user by determining an order of performing conditions that need to be satisfied for acquiring the multiple virtual items, in accordance with one embodiment of the present disclosure.

Incorporating the detailed descriptions of the system 100 of FIG. 1, flow diagram 200 of FIG. 2, and the drawings of FIGS. 3-4, flow diagram 500 of FIG. 5 discloses a method for facilitating the acquisition of multiple virtual items desired by a requesting user by determining an order of performing conditions that need to be satisfied for acquiring the multiple virtual items, in accordance with one embodiment of the present disclosure. In particular, the operations performed in flow diagram 500 may be implemented by one or more of the previously described components, and also system 100 described in FIG. 1, including virtual item acquisition system 120 and the cloud game network 190.

At 510 and 520, the method includes receiving a first request to acquire a first virtual item from a device of a requesting user, and receiving a second request to acquire a second virtual item from the device of the requesting user. For example, the requesting user may be playing a video game, and knows of the two virtual items through discussions with other players or through research (e.g., online research), and desires information about acquiring the two virtual items, and further would like to begin acquiring the two virtual items. Also, the requesting user may encounter the two virtual items through an interactive entertainment experience (multi-player gaming session, metaverse, etc.) as previously discussed. Though the description of FIG. 5 involves the playing of a single video game to acquire virtual items, embodiments of the present disclosure could be extended to facilitate acquiring multiple virtual items through game plays of multiple video games.

At 530, the method includes accessing first metadata of the first virtual item, wherein the first virtual item is encoded with the first metadata including a first set of conditions that was satisfied in a video game to acquire the first virtual item. For example, a first user may have acquired the first and the second virtual items while playing a single video game. In that case, the first set of conditions was satisfied by the first user in the game play of the video game.

At 540, the method includes accessing second metadata of the second virtual item, wherein the second virtual item is encoded with the second metadata including a second set of conditions that was satisfied in the video game to acquire the second virtual item. In particular, because the first and second virtual items were acquired through the same video game the second set of conditions was also satisfied by the first user in the game play of that video game.

At 550, the method includes determining an order of performing conditions taken from both the first set of conditions and the second set of conditions that provides a process that meets a threshold of efficiency for earning the first virtual item and the second virtual item. For example, within the confines of a single video game, the conditions performed to satisfy the first set of conditions and the second set of conditions to acquire the first virtual item and the second virtual item may have some logical ordering (e.g., a player needs to accomplish conditions A-C in order, such as needing a particular weapon to finish condition C) or may have some overlapping (e.g., condition A needed to acquire the first virtual item is identical to condition B needed to acquire the second virtual item). It would be fruitless to begin satisfying condition C of the first set of conditions when that condition is dependent on satisfying condition A.

For example, because a player may perform conditions in any order, there can be determined an efficiency rating for performing orders of conditions when acquiring the first and second virtual items. The efficiency rating may be based on the amount of actions needed to be performed to satisfy the conditions in the first and second set of conditions based on the corresponding order. As such, any determined order with an efficiency rating greater than a threshold would be suitable for the player to begin acquiring the first and second virtual items. In one embodiment, the determined order provides the least amount of actions to be performed to satisfy the first set of conditions and the second set of conditions in order earn the first virtual item and the second virtual item.

As previously introduced, it could be that the virtual items were encountered in a metaverse. In that case, wherein the first virtual item acquired by the first user is encoded with first metadata including one or more conditions that were satisfied by the first user in a process performed for acquiring the first virtual item in a video game, and wherein the second virtual item acquired by the first user is encoded with second metadata including one or more conditions that were satisfied by the first user in a process performed for acquiring the second virtual item in the video game. In one embodiment, artificial intelligence is used to analyze the first metadata and the second metadata to determine the order of satisfying the conditions in the first set of conditions and the second set of conditions to acquire the first virtual item and the second virtual item.

In another case, the requesting user may be participating in an interactive entertainment experience (e.g., multi-player gaming session, metaverse, etc.) and encounters the two virtual items, who may be owned by one player or two separate players. In this case, the requesting user also desires information about acquiring the two virtual items, and further would like to begin acquiring the two virtual items. In one embodiment, artificial intelligence is used to analyze the metadata associated with the two virtual items to determine the order of satisfying conditions (e.g., in a first set of conditions associated with the first virtual item and a second set of conditions associated with the second virtual item) to acquire the first virtual item and the second virtual item.

In another case, it could be that the two virtual items are generally of interest to the requesting user, and not necessarily be made aware of through encounters in a metaverse. For example, the requesting user may know of the items through discussions with friends or through online research, etc. The virtual items may be acquired by playing one or more video game. In one embodiment, artificial intelligence is used to analyze a plurality of game plays of a plurality of players playing the one or more video games to determine the order of performing the conditions in the first and second set of conditions that need to be satisfied to earn the first virtual item and the second virtual item.

Generally, artificial intelligence (AI) techniques may be implemented to build AI models to determine orders of performing and/or satisfying conditions within one or more video games. In that manner, a recommendation by the virtual item acquisition system may be provided to the requesting user illustrating an order of performing the conditions in the first and second set of conditions needed to acquire the first virtual item and the second virtual item, wherein the order meets a threshold of an efficiency rating. For example, a deep/machine learning engine may be configured build or train and implement an AI model for determining the order of performing conditions. The AI model may be a machine learning model configured to apply machine learning to learn orders of satisfying conditions to earn virtual items in one or more game plays of one or more video games and make recommendations for satisfying conditions in a certain order. In another embodiment, the AI learning model is a deep learning model configured to apply deep learning to learn orders of satisfying conditions to earn virtual items in one or more game plays of one or more video games and make recommendations for satisfying conditions in a certain order, wherein machine learning is a sub-class of artificial intelligence, and deep learning is a sub-class of machine learning. As such, artificial intelligence is used to learn orders of satisfying conditions to earn virtual items in one or more game plays of one or more video games and make recommendations for satisfying conditions in a certain order.

Figure 6:
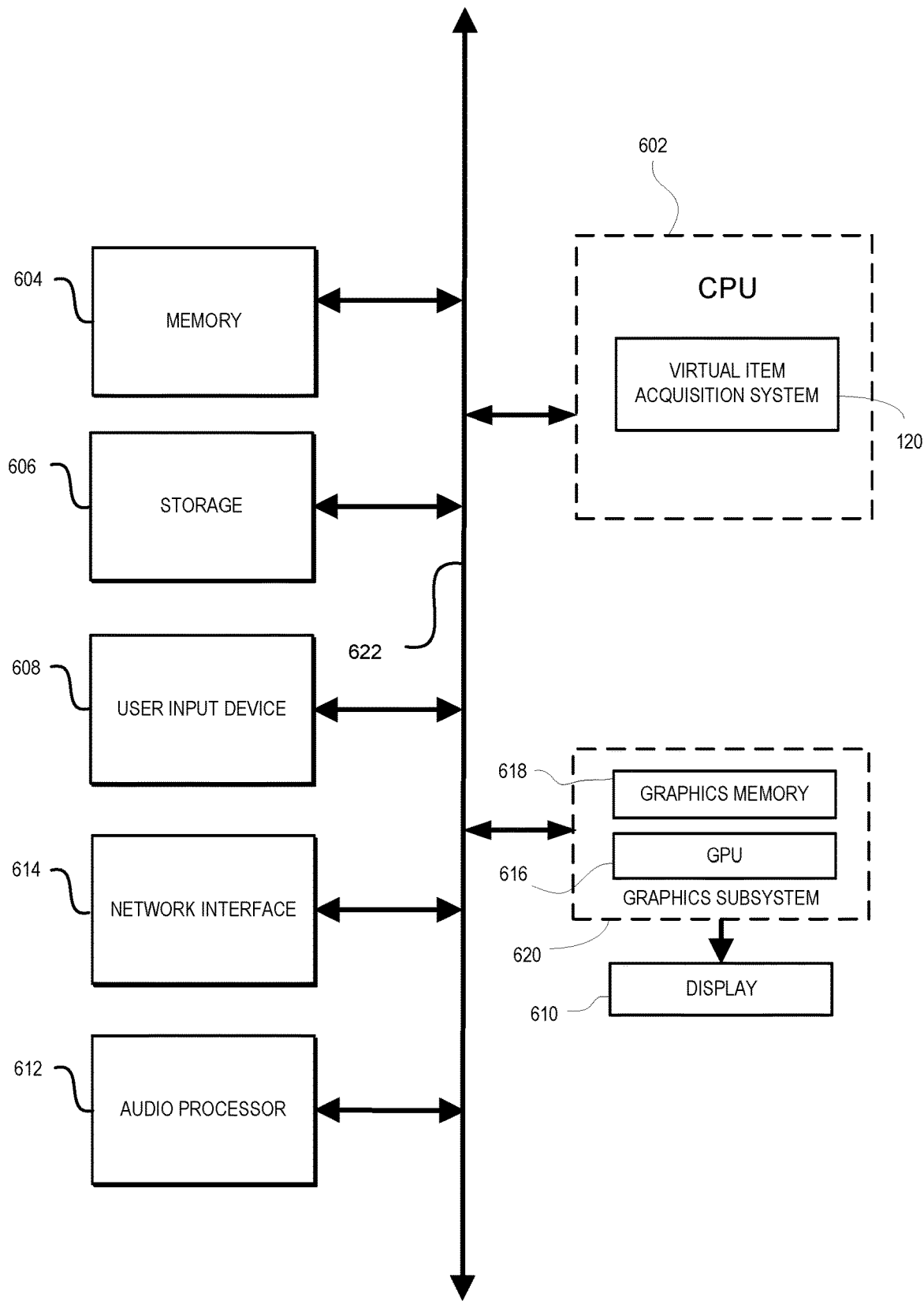
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be remote from the player (e.g., back-end server processor), or on one of many servers using virtualization in a game cloud system for remote streaming of gameplay to clients, or for implementing additional services such as virtual item acquisition system functionality.

In particular, CPU 602 may be configured to implement the virtual item acquisition system 120 with functionality configured to associate a virtual item with metadata that communicates the conditions under which the virtual item was originally acquired by a user, facilitate the display of information in a UI about what is needed by a requesting user to acquire a virtual item that is discovered in a virtual environment such as a metaverse, and enable the user to jump into a game play of a video game at a point that allows the requesting user to satisfy a condition that is required to acquire the virtual item. For example, the virtual item acquisition system 120 may cooperate with a local client or game cloud system to launch instances of a corresponding video game at a corresponding point that allows requesting user to begin acquiring the virtual item.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within an AI engine (e.g., machine learning engine 190) to provide additional processing power, such as for the AI, machine learning functionality, or deep learning functionality, etc.

The graphics subsystem 620 periodically outputs pixel data for an image from graphics memory 618 to be displayed on display device 610. Display device 610 can be any device capable of displaying visual information in response to a signal from the device 600, including CRT. LCD, plasma, and OLED displays. Device 600 can provide the display device 610 with an analog or digital signal, for example.

In other embodiments, the graphics subsystem 620 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for facilitating the acquisition of a virtual item for a requesting user made aware of the virtual item within a virtual environment (e.g., metaverse).

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations.

In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
receiving a notification of interest regarding a virtual item from a device of a requesting user, wherein the virtual item is owned by a first user, wherein the virtual item is displayed in a virtual environment viewable by the requesting user;
accessing information of the virtual item, the information including one or more conditions that were satisfied by the first user in a process performed for acquiring the virtual item;
determining at least one condition to be satisfied by the requesting user in order to acquire the virtual item;
generating a user interface configured to indicate the at least one condition to be satisfied and a selectable icon that when selected initiates a request to acquire the virtual item;
sending the user interface to the device of the requesting user for display;
receiving the request to acquire the virtual item from the device of the requesting user; and
launching game play of a video game based on a first condition at a first point in the game play of the video game of the requesting user that enables the first condition to be satisfied,
wherein the game play is controlled by the requesting user.

2. The method of claim 1,
wherein the virtual environment is a metaverse within which the requesting user and the first user are participants.

3. The method of claim 1, further comprising:
choosing the first condition, wherein the first condition is presented in the video game;
determining that the first condition is aligned with the first point in the game play of the video game of the requesting user;
accessing a first snapshot in a game play of the video game of the requesting user, wherein the first snapshot was captured at the first point in the game play of the video game of the requesting user; and
instantiating an instance of the video game using the first snapshot for the game play of the video game of the requesting user that begins at the first point in the video game where the first snapshot was captured to enable the first condition to be satisfied by the requesting user.

4. The method of claim 3, further comprising:
determining that the first condition has been satisfied;
determining a second condition is aligned with a second point in the game play of the video game of the requesting user;
accessing a second snapshot in the game play of the requesting user, wherein the second snapshot was captured at a second point in the game play of the requesting user; and
jumping to the second point in the game play of the video game to enable the second condition to be satisfied by the requesting user.

5. The method of claim 3, further comprising:
determining that the first condition has been satisfied;
determining a second condition is aligned with a second point in a game play of a second video game of the requesting user;
accessing a second snapshot in the game play of the second video game of the requesting user, wherein the second snapshot was captured at the second point in the game play of the second video game of the requesting user; and
instantiating an instance of the second video game using the second snapshot for the game play of the second video game of the requesting user that begins at the second point in second video game where the second snapshot was captured to enable the second condition to be satisfied by the requesting user.

6. The method of claim 1, further comprising:
tracking each of the one or more conditions of one or more corresponding video games during one or more game plays of one or more corresponding video games by the first player user; and
tracking one or more game plays of the requesting user.

7. A non-transitory computer-readable medium storing a computer program for performing a method, the computer-readable medium comprising:
program instructions for receiving a notification of interest regarding a virtual item from a device of a requesting user, wherein the virtual item is owned by a first user, wherein the virtual item is displayed in a virtual environment viewable by the requesting user;
program instructions for accessing information of the virtual item, the information including one or more conditions that were satisfied by the first user in a process performed for acquiring the virtual item;
program instructions for determining at least one condition to be satisfied by the requesting user in order to acquire the virtual item;
program instructions for generating a user interface configured to indicate the at least one condition to be satisfied and a selectable icon that when selected initiates a request to acquire the virtual item;
program instructions for sending the user interface to the device of the requesting user for display;
program instructions for receiving the request to acquire the virtual item from the device of the requesting user; and
program instructions for launching game play of a video game based on a first condition at a first point in the game play of the video game of the requesting user that enables the first condition to be satisfied,
wherein the game play is controlled by the requesting user.

8. The non-transitory computer-readable medium of claim 7,
wherein in the method the virtual environment is a metaverse within which the requesting user and the first user are participants.

9. The non-transitory computer-readable medium of claim 7, further comprising:
program instructions for choosing the first condition, wherein the first condition is presented in the video game;
program instructions for determining that the first condition is aligned with the first point in the game play of the video game of the requesting user;
program instructions for accessing a first snapshot in a game play of the video game of the requesting user, wherein the first snapshot was captured at the first point in the game play of the video game of the requesting user; and program instructions for instantiating an instance of the video game using the first snapshot for the game play of the video game of the requesting user that begins at the first point in the video game where the first snapshot was captured to enable the first condition to be satisfied by the requesting user.

10. The non-transitory computer-readable medium of claim 9, further comprising:

program instructions for determining that the first condition has been satisfied;

program instructions for determining a second condition is aligned with a second point in the game play of the video game of the requesting user;

program instructions for accessing a second snapshot in the game play of the requesting user, wherein the second snapshot was captured at a second point in the game play of the requesting user; and program instructions for jumping to the second point in the game play of the video game to enable the second condition to be satisfied by the requesting user.

11. The non-transitory computer-readable medium of claim 9, further comprising:

program instructions for determining that the first condition has been satisfied;

program instructions for determining a second condition is aligned with a second point in a game play of a second video game of the requesting user;

program instructions for accessing a second snapshot in the game play of the second video game of the requesting user, wherein the second snapshot was captured at the second point in the game play of the second video game of the requesting user; and program instructions for instantiating an instance of the second video game using the second snapshot for the game play of the second video game of the requesting user that begins at the second point in second video game where the second snapshot was captured to enable the second condition to be satisfied by the requesting user.

12. The non-transitory computer-readable medium of claim 7, further comprising:

program instructions for tracking each of the one or more conditions of one or more corresponding video games during one or more game plays of one or more corresponding video games by the first user; and program instructions for tracking one or more game plays of the requesting user.

13. A computer system comprising:

a processor;

memory coupled to the processor and having stored therein instructions that, if executed by the computer system, cause the computer system to execute a method, comprising:

receiving a notification of interest regarding a virtual item from a device of a requesting user, wherein the virtual item is owned by a first user, wherein the virtual item is displayed in a virtual environment viewable by the requesting user;

accessing information of the virtual item, the information including one or more conditions that were satisfied by the first user in a process performed for acquiring the virtual item;

determining at least one condition to be satisfied by the requesting user in order to acquire the virtual item;

generating a user interface configured to indicate the at least one condition to be satisfied and a selectable icon that when selected initiates a request to acquire the virtual item;

sending the user interface to the device of the requesting user for display;

receiving the request to acquire the virtual item from the device of the requesting user; and launching game play of a video game based on a first condition at a first point in the game play of the video game of the requesting user that enables the first condition to be satisfied, wherein the game play is controlled by the requesting user.

14. The computer system of claim 13, the method further comprising:

choosing the first condition, wherein the first condition is presented in the video game;

determining that the first condition is aligned with the first point in the game play of the video game of the requesting user;

accessing a first snapshot in a game play of the video game of the requesting user, wherein the first snapshot was captured at the first point in the game play of the video game of the requesting user; and instantiating an instance of the video game using the first snapshot for the game play of the video game of the requesting user that begins at the first point in the video game where the first snapshot was captured to enable the first condition to be satisfied by the requesting user.

15. The computer system of claim 14, the method further comprising:

determining that the first condition has been satisfied;

determining a second condition is aligned with a second point in the game play of the video game of the requesting user;

accessing a second snapshot in the game play of the requesting user, wherein the second snapshot was captured at a second point in the game play of the requesting user; and jumping to the second point in the game play of the video game to enable the second condition to be satisfied by the requesting user.

16. The computer system of claim 14, the method further comprising:

determining that the first condition has been satisfied;

determining a second condition is aligned with a second point in a game play of a second video game of the requesting user;

accessing a second snapshot in the game play of the second video game of the requesting user, wherein the second snapshot was captured at the second point in the game play of the second video game of the requesting user; and instantiating an instance of the second video game using the second snapshot for the game play of the second video game of the requesting user that begins at the second point in second video game where the second snapshot was captured to enable the second condition to be satisfied by the requesting user.

17. The computer system of claim 13, the method further comprising:

tracking each of the one or more conditions of one or more corresponding video games during one or more game plays of one or more corresponding video games by the first user; and tracking one or more game plays of the requesting user.

* * * * *